US012707214B2

(12) United States Patent
Seo et al.

(10) Patent No.: US 12,707,214 B2
(45) Date of Patent: Aug. 11, 2026

(54) APPARATUS AND METHOD FOR MEASURING ACOUSTICS IN VACUUM CHAMBER

(71) Applicant: Samsung Display Co., LTD., Yongin-si (KR)

(72) Inventors: Changwook Seo, Yongin-si (KR); Eu Gene Kang, Yongin-si (KR); Young-Hun Park, Yongin-si (KR); Seung Geun Yun, Yongin-si (KR); Cheolrae Jo, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 196 days.

(21) Appl. No.: 18/510,002

(22) Filed: Nov. 15, 2023

(65) Prior Publication Data

US 2026/0040015 A1 Feb. 5, 2026

(30) Foreign Application Priority Data

Mar. 29, 2023 (KR) ........................ 10-2023-0041374

(51) Int. Cl.
*H04R 29/00* (2006.01)

(52) U.S. Cl.
CPC .................................... *H04R 29/00* (2013.01)

(58) Field of Classification Search
CPC ...................................................... H04R 29/00
USPC .............................................. 381/56, 58, 59
See application file for complete search history.

(56) References Cited

U.S. PATENT DOCUMENTS

| | | | | |
|---|---|---|---|---|
| 6,353,670 | B1 * | 3/2002 | Gasner | H04R 1/288 381/59 |
| 9,479,884 | B2 * | 10/2016 | Kim | H04R 7/08 |
| 9,992,592 | B1 * | 6/2018 | Alam | H04R 29/001 |
| 10,750,261 | B2 * | 8/2020 | Fallon | H04R 1/2803 |
| 2007/0172072 | A1 * | 7/2007 | Yang | H04R 29/00 381/59 |
| 2015/0373469 | A1 * | 12/2015 | Pan | H04R 29/001 381/59 |
| 2017/0350810 | A1 * | 12/2017 | Tumpold | G01N 21/1702 |

FOREIGN PATENT DOCUMENTS

| | | | |
|---|---|---|---|
| KR | 10-1168743 | B1 | 7/2012 |
| KR | 10-1174249 | B1 | 8/2012 |
| KR | 10-1251781 | B1 | 4/2013 |
| KR | 10-2017-0076813 | A | 7/2017 |
| KR | 10-2189895 | B1 | 12/2020 |

* cited by examiner

*Primary Examiner* — Xu Mei
(74) *Attorney, Agent, or Firm* — Womble Bond Dickinson (US) LLP

(57) ABSTRACT

An acoustic measuring apparatus installed in a vacuum chamber to determine a state of a sound wave generation source in the vacuum chamber is provided. The acoustic measuring apparatus includes: a sound wave collecting apparatus in a vacuum chamber and configured to collect sound generated from a sound wave generation source in the vacuum chamber; and a feed-through configured to convert sound wave information of sound collected by the sound wave collecting apparatus into an electrical signal and to transmit the sound wave information outside the vacuum chamber.

20 Claims, 3 Drawing Sheets

APPARATUS AND METHOD FOR MEASURING ACOUSTICS IN VACUUM CHAMBER

CROSS-REFERENCE TO RELATED APPLICATION

The present application claims priority to and the benefit of Korean Patent Application No. 10-2023-0041374, filed on Mar. 29, 2023, in the Korean Intellectual Property Office, the entire disclosure of which is incorporated herein by reference.

BACKGROUND

1. Field

Aspects of embodiments of the present disclosure relates to an apparatus and method for measuring acoustics in a vacuum chamber.

2. Description of the Related Art

Manufacturing QD (Quantum Dot) OLED (Organic Light Emitting Diode) displays utilizes organic thin film deposition.

An inline type evaporator for depositing a large-area organic thin film for existing OLED display is often used, and the large-area organic thin film is made by deposition coating of organic material gas on a large substrate in a high-vacuum chamber.

To confirm whether or not a good deposition process has been performed on the substrate in the vacuum chamber, a method of measuring the sound (e.g., sound wave) generated in the vacuum chamber may be used.

The method of measuring the sound includes collecting sound waves generated by (e.g., emitted by) a sound wave generation source to determine the state (e.g., the condition) of the sound wave generation source.

However, in general, there is no medium (e.g., air) to transmit sound waves in a vacuum, so sound wave measurement in the vacuum chamber is impossible.

Therefore, in recent years, research has been conducted to determine the state of the sound wave generation source by directly contacting the test object in the vacuum chamber and collecting sound waves through the test objection and converting the sound waves into electrical signals according to the vibration of the test object.

For example, a measuring apparatus including a sound wave collecting apparatus is placed in contact with a sound wave measurement site in the vacuum chamber, the sound wave generated from this site is transmitted to the inside through a solid medium (e.g., a wall) of the measurement box, and the sound wave collecting apparatus is transmitted to the sound wave collecting apparatus through an air medium present in the measuring apparatus.

SUMMARY

An acoustic measuring apparatus installed in a vacuum chamber to determine a state of a sound wave generation source in the vacuum chamber is provided and, according to an embodiment of the present disclosure, includes: a sound wave collecting apparatus in a vacuum chamber and configured to collect sound generated from a sound wave generation source in the vacuum chamber; and a feed-through configured to convert sound wave information of sound collected by the sound wave collecting apparatus into an electrical signal and to transmit the sound wave information outside the vacuum chamber.

The sound wave collecting apparatus may be attached on an inner wall of the vacuum chamber or on a moving apparatus in the vacuum chamber.

The moving apparatus may be any one of a vacuum robot, a pump, a mask, a lift apparatus, a turn table, and a flip chip.

The sound wave collecting apparatus may be at atmospheric pressure inside.

The sound wave collecting apparatus may be configured to detect vibration of the inner wall of the vacuum chamber or the moving apparatus and to convert the vibration into a sound wave.

The sound wave collecting apparatus may be installed inside an atmospheric pressure (ATM) box installed in the vacuum chamber.

The ATM box may be installed on the inner wall of the vacuum chamber or in the moving apparatus in the vacuum chamber.

The ATM box may be at atmospheric pressure inside.

An inside of the ATM box may be sealed by a solid wall.

The sound wave collecting apparatus may be fixed on an inner surface of a wall of the ATM box.

The sound wave collecting apparatus may be configured to detect a vibration of the wall of the ATM box and to convert the detected vibration into sound waves for collection.

The feed-through may be inside the ATM box and may extend through a wall of the ATM box.

The vacuum chamber may be configured to used in a high vacuum deposition process.

An acoustic measuring method using the acoustic measuring apparatus as described above is also provided. The method, according to an embodiment of the present disclosure, includes: collecting sound generated from the sound wave generation source in the vacuum chamber by the sound wave collecting apparatus; converting sound wave information of sound collected from the sound wave collecting apparatus into an electrical signal by a feed-through and transmitting the electrical signal as electrical signal data outside the vacuum chamber; collecting and analyzing the electrical signal data transmitted outside the vacuum chamber; and diagnosing a state of the sound wave generation source according to the analysis result of the electrical signal data.

The transmitting of the electrical signal data may be performed by using a WiFi communication apparatus.

The collecting and analyzing the electrical signal data may be performed by using a computer.

The diagnosing the state of the sound wave generation source may be performed manually by visual confirmation of the collected electrical signal data.

The diagnosing the state of the sound wave generation source may be performed by using an artificial intelligence (AI) voice analysis system.

The AI voice analysis system may be configured to detect an operating state, an impact and vibration state, and an abnormality of a driving part of the sound wave generation source by classification by noise.

The AI voice analysis system may be configured to determine a position of the sound wave generation source by a sound wave collected by a plurality of the sound wave collecting apparatuses installed at a plurality of positions.

According to embodiments of the present disclosure, sound waves may be analyzed by collecting sound waves generated in the vacuum chamber by an acoustic measuring apparatus installed in the vacuum chamber and converting them into electrical signals.

By measuring the abnormal noise caused by the driver, grinding, impact, vibration, etc. of the sound wave generation source, it can be determined whether or not the sound wave generation source is driving abnormally.

By linking the acoustic measuring apparatus with the AI voice analysis system, the sound can be classified by operation and noise of the sound wave generation source so that the operation status of the sound wave generation source can be determined.

By installing a sound wave collecting apparatus at multiple positions in the vacuum chamber, the position of sound wave generation can be determined.

DETAILED DESCRIPTION

Figure 1:
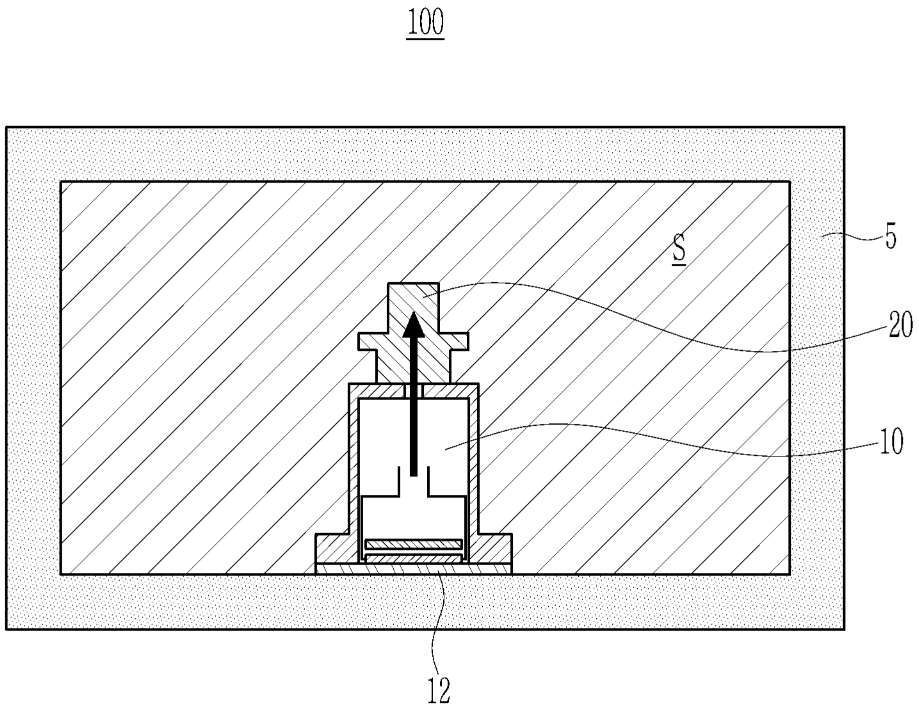
FIG. 1 is a schematic view of an acoustic measuring apparatus according to an embodiment of the present disclosure.

The present disclosure will be described more fully hereinafter with reference to the accompanying drawings, in which embodiments of the present disclosure are shown. The present disclosure, however, may be implemented in various different forms and is not limited to the embodiments described herein.

To more clearly describe the aspects and features of the present disclosure, portions of the described embodiments that are irrelevant to the present disclosure or are well known to those of ordinary skill in the art to which the present disclosure pertains have been omitted.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, an acoustic measuring apparatus and method according to embodiments of the present disclosure will be described with reference to FIG. 1 to FIG. 3.

FIG. 1 is a schematic view of an acoustic measuring apparatus according to an embodiment of the present disclosure.

Referring to FIG. 1, the acoustic measuring apparatus 100 includes a sound wave collecting apparatus 10 and a feedthrough 20 installed in a vacuum chamber 5.

A sound wave generation source is drawn into (e.g., generates sound waves in) the vacuum chamber 5, and the sound wave collecting apparatus 10 collects sound waves generated from the sound wave generation source.

The vacuum chamber 5 may have a high vacuum inside S and may be used in a high vacuum deposition process.

The sound wave collecting apparatus 10 may be attached (e.g., installed attached) to one inner wall of the vacuum chamber 5 or may be attached to a separate moving apparatus drawn into the vacuum chamber 5.

The moving apparatus may be any one of a vacuum robot, a pump, a mask, a lift apparatus, a turn table, and a flip chip, as some examples.

When the sound wave collecting apparatus 10 is attached to an attachment site 12 at one inner wall of the vacuum chamber 5, the sound wave generation source may also be attached to the one inner wall of the vacuum chamber 5.

In use, a sound wave generated from (e.g., emitted by) the sound wave generation source is transmitted to the sound wave collecting apparatus 10 in the form of vibration through the inner wall of the vacuum chamber 5, and the sound wave collecting apparatus 10 detects the vibration and converts it into sound waves and collects it.

In addition, when the sound wave collecting apparatus 10 is attached to the moving apparatus, the sound waves generated by the moving apparatus are transmitted to the sound wave collecting apparatus 10 in the form of vibrations.

The sound wave collecting apparatus 10 detects the vibration of the moving apparatus, converts it into sound waves, and collects it.

The inside of the sound wave collecting apparatus 10 may be at atmospheric pressure (atm).

The sound wave collecting apparatus 10 includes a front electrode (e.g., a diaphragm) formed on the side of the sound wave (or vibration) generation source and a fixed electrode spaced apart from the front electrode, and the vibration of the sound wave generation source is measured as a change in capacitance generated as the separation distance between the front electrode and the fixed electrode changes.

At this time, a DC external power supply is utilized to obtain an output from the charge formed between the two electrodes.

A feed-through 20 is attached and installed outside the other side of the sound wave collecting apparatus 10.

The feed-through 20 may convert the sound wave information collected from the sound wave collecting apparatus 10 into an electrical signal and transmit it outside the vacuum chamber 5.

The feed-through 20 may transmit an electrical signal between the atmosphere and the vacuum.

For example, the sound waves collected from the sound wave collecting apparatus 10 are output to the feed-through 20 through an atmosphere in the sound wave collecting apparatus 10, and the feed-through 20 converts the sound waves into electrical signals and transmits the electrical signal to the outside through a vacuum in the vacuum chamber 5.

The electrical signal transmitted from the feed-through 20 is transmitted outside the vacuum chamber 5 for sound wave analysis.

Figure 2:
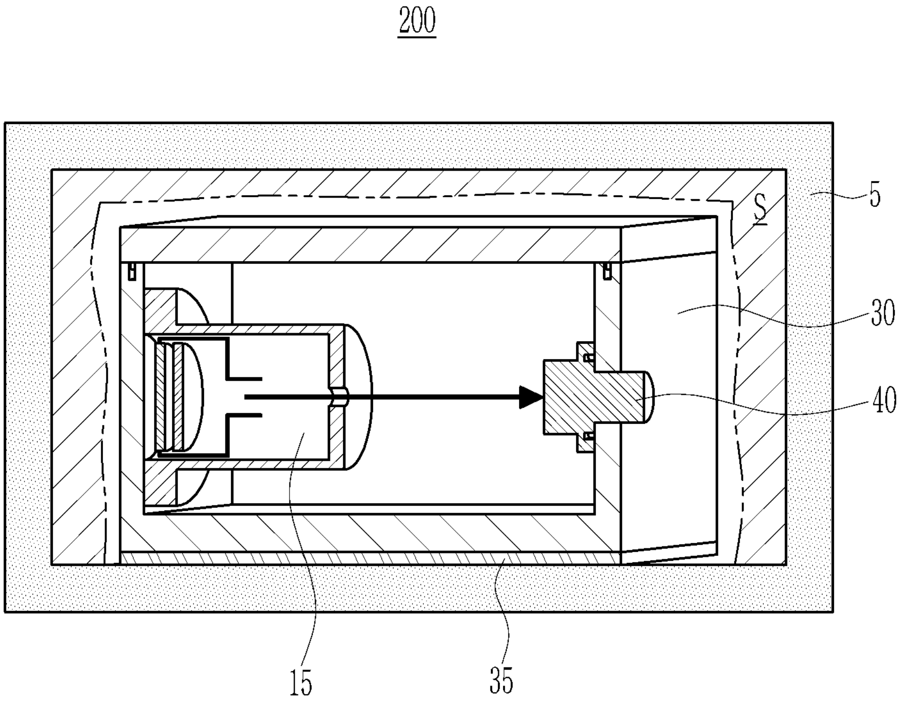
FIG. 2 is a schematic view of an acoustic measuring apparatus according to another embodiment of the present disclosure.

FIG. 2 is a schematic view of an acoustic measuring apparatus according to another embodiment of the present disclosure.

Referring to FIG. 2, the acoustic measuring apparatus 200 according to another embodiment of the present disclosure includes a sound wave collecting apparatus 15 and a feed-through 40.

The sound wave collecting apparatus 15 may be installed inside an atmospheric pressure (ATM) box 30 installed in the vacuum chamber 5.

The vacuum chamber 5 has a high vacuum inside S, and the ATM box 30 may be installed on one inner wall of the vacuum chamber 5 or attached to a separate moving apparatus drawn into the vacuum chamber 5.

The ATM box 30 may have atmospheric pressure (atm) therein.

The ATM box 30 may be closed and sealed internally by a solid wall (e.g., by a wall formed of a solid material).

The ATM box 30 may have a hexahedral shape with a hollow therein.

The sound wave collecting apparatus 15 may be fixed inside the ATM box 30 and on an inner surface of the wall of the ATM box 30.

When the ATM box 30 is attached to the attachment site 35 at one inner wall of the vacuum chamber 5, the sound wave generation source may be attached to the inner wall of the vacuum chamber 5.

In use, the sound wave generated from (e.g., emitted by) the sound wave generation source is transmitted to the ATM box 30 in the form of a vibration through the inner wall of the vacuum chamber 5 and transmits to the sound wave collecting apparatus 15 in the form of a vibration through the wall of the ATM box 30.

The sound wave collecting apparatus 15 detects this vibration, converts it into sound waves, and collects it.

When the ATM box 30 is attached to the moving apparatus, the sound waves generated by the moving apparatus are transmitted to the sound wave collecting apparatus 15 through the wall of the ATM box 30 in the form of a vibration, and the sound wave collecting apparatus 15 detects the vibration, converts it into sound waves, and collects it.

The feed-through 40 may be disposed to penetrate (or extend through) one wall of the ATM box 30 at a position opposite the sound wave collecting apparatus 15 inside the ATM box 30.

Because the ATM box 30 is at atmospheric pressure inside, sound waves collected from the sound wave collecting apparatus 15 may be transmitted to the feed-through 40 through the atmosphere (e.g., through air).

The feed-through 40 may transmit an electrical signal between the atmosphere and the vacuum.

For example, the sound waves collected in the sound wave collecting apparatus 15 are output to the feed-through 40 through the ATM box 30, and the feed-through 40 converts the sound waves into electrical signals and transmits the electrical signal to the outside through the vacuum in the vacuum chamber 5.

The electrical signal transmitted from the feed-through 40 is transmitted outside the vacuum chamber 5 for sound wave analysis.

Figure 3:
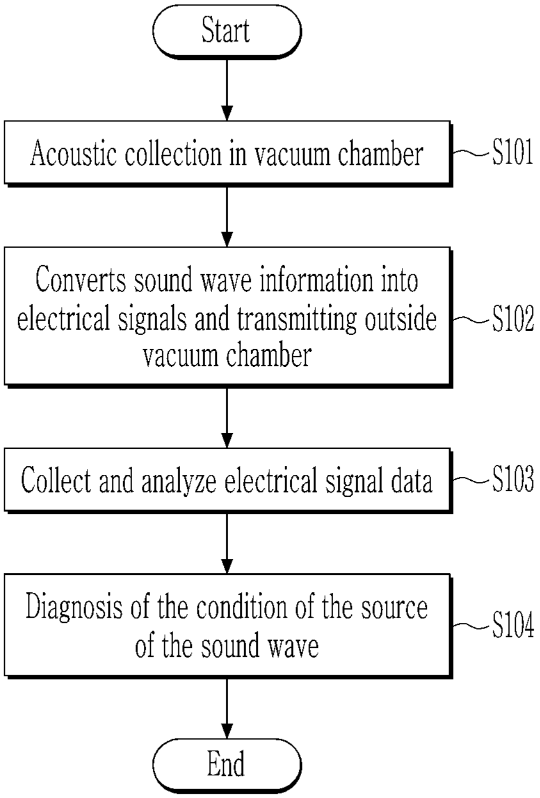
FIG. 3 is a flowchart describing an acoustic measuring method according to an embodiment of the present disclosure.

FIG. 3 is a flowchart describing an acoustic measuring method according to an embodiment of the present disclosure.

Referring to FIG. 3, the acoustic measuring method according to an embodiment of the present disclosure is an acoustic measuring method using the acoustic measuring apparatus 100 and 200, described above with reference to FIG. 1 and FIG. 2, respectively. First, sound generated from a sound wave generation source in a vacuum chamber is collected by a sound wave collecting apparatus (S101).

As described above, the sound wave collecting apparatus 10, 15 may be installed on the inner wall of the vacuum chamber 5, the inner wall of the ATM box 30, or attached to a moving apparatus, and in each embodiment, acoustic vibrations are transmitted to the sound wave collecting apparatus 10, 15 to be collected.

Thereafter, the sound wave information of the sound collected from the sound wave collecting apparatus is converted into an electrical signal and transmitted outside the vacuum chamber by the feed-through 20, 40 (S102).

As described above, feed-throughs 20, 40 may be installed attached to the other outer wall of the sound wave collecting apparatus 10 or may be disposed so that the sound wave collecting apparatus 15 penetrates one wall of the ATM box 30.

Because the feed-throughs 20, 40 can transmit electrical signals between the atmosphere and the vacuum, the sound waves collected from the sound wave collecting apparatus 10, 15 are output to the feed-throughs 20, 40, and the feed-throughs 20, 40 convert the sound waves into electrical signals and transmit the electrical signals to the outside through the vacuum in the vacuum chamber 5.

Thereafter, electrical signal data transmitted outside the vacuum chamber is collected and analyzed (S103).

Electrical signal data may be transmitted outside the vacuum chamber 5 using a suitable wireless communication apparatus using a wireless communication protocol (e.g., a WiFi communication apparatus) and may be collected and analyzed using a computer (e.g., a PC).

Thereafter, the state of the sound wave generation source is diagnosed according to the analysis result of the electrical signal data (S104).

Diagnosis of the state of the sound wave generation source may be performed manually based on visual confirmation of the entire collected electrical signal data or may be performed using an artificial intelligence (AI) voice (or sound) analysis system.

The AI voice analysis system classifies the collected electrical signal data and distinguishes it as noise-specific data.

The noise can be periodic specific noise, rolling noise of rollers, and various grinding noises.

Through such noise-specific data, the operating state, shock state, and vibration state of the sound wave generation source can be distinguished and classified, and through this, abnormalities in the driving part (e.g., the driver) can be diagnosed.

The AI voice analysis system may be implemented by using at least one processor operating according to a program (e.g., a predetermined or stored program), and the program may include instructions for performing classification by operation and noise of the collected electrical signal data.

The sound wave collecting apparatus 10, 15 may be installed at a plurality of positions in the vacuum chamber 5, and the AI voice analysis system may determine the position of the sound wave generation source according to the sound waves collected by the sound wave collecting apparatus 10, 15 installed at the plurality of positions.

As such, according to embodiments of the present disclosure, the sound waves may be analyzed by collecting sound waves generated in the vacuum chamber by using an acoustic measuring apparatus installed in the vacuum chamber and converting them into electrical signals.

In addition, by measuring the abnormal noise caused by the driving part, grinding, impact, vibration, etc. of the sound wave generation source, it is possible to determine whether or not the sound wave generation source is driving abnormally.

In addition, by linking the acoustic measuring apparatus with the AI voice analysis system, it is possible to classify the sound by operation and noise of the sound wave generation source, so that the operation status of the sound wave generation source can be determined.

In addition, by installing a sound wave collecting apparatus at plurality of positions in the vacuum chamber, the position of sound wave generation can be determined.

Although embodiments of the present disclosure have been described in detail above, the scope of the present disclosure is not limited thereto. Various modifications and other embodiments that would be understood by a person of an ordinary skilled in the art according to the above-described concepts of the present disclosure defined in the following claims and their equivalents also fall within the scope of the present disclosure.

DESCRIPTION OF SOME REFERENCE SYMBOLS

| | |
|---|---|
| 100, 200: | acoustic measuring apparatus |
| 5: | vacuum chamber |
| 10, 15: | sound wave collecting apparatus |
| 20, 40: | feed-through |
| 30: | ATM box |
| 12, 35: | attachment site |

What is claimed is:

1. An acoustic measuring apparatus installed in a vacuum chamber to determine a state of a sound wave generation source in the vacuum chamber, comprising:
   - a sound wave collecting apparatus in the vacuum chamber and configured to collect sound generated from the sound wave generation source in the vacuum chamber; and
   - a feed-through configured to convert sound wave information of sound collected by the sound wave collecting apparatus into an electrical signal and to transmit the sound wave information outside the vacuum chamber,
   - wherein the acoustic measuring apparatus is configured for an inside of the sound wave collecting apparatus to be at a higher pressure than the vacuum chamber is at.

2. The acoustic measuring apparatus of claim 1, wherein the sound wave collecting apparatus is attached on an inner wall of the vacuum chamber or on a moving apparatus in the vacuum chamber.

3. The acoustic measuring apparatus of claim 2, wherein the moving apparatus is any one of a vacuum robot, a pump, a mask, a lift apparatus, a turn table, and a flip chip.

4. The acoustic measuring apparatus of claim 2, wherein the sound wave collecting apparatus is at atmospheric pressure inside.

5. The acoustic measuring apparatus of claim 4, wherein the sound wave collecting apparatus is configured to detect vibration of the inner wall of the vacuum chamber or the moving apparatus and to convert the vibration into a sound wave.

6. The acoustic measuring apparatus of claim 2, wherein the sound wave collecting apparatus is installed inside an atmospheric pressure (ATM) box installed in the vacuum chamber.

7. The acoustic measuring apparatus of claim 6, wherein the ATM box is installed on the inner wall of the vacuum chamber or in the moving apparatus in the vacuum chamber.

8. The acoustic measuring apparatus of claim 6, wherein the ATM box is at atmospheric pressure inside.

9. The acoustic measuring apparatus of claim 6, wherein an inside of the ATM box is sealed by a solid wall.

10. The acoustic measuring apparatus of claim 9, wherein the sound wave collecting apparatus is fixed on an inner surface of a wall of the ATM box.

11. The acoustic measuring apparatus of claim 10, wherein the sound wave collecting apparatus is configured to detect a vibration of the wall of the ATM box and to convert the detected vibration into sound waves for collection.

12. The acoustic measuring apparatus of claim 6, wherein the feed-through is inside the ATM box and extends through a wall of the ATM box.

13. The acoustic measuring apparatus of claim 1, wherein the vacuum chamber is configured to used in a high vacuum deposition process.

14. An acoustic measuring method using the acoustic measuring apparatus according to claim 1, the method comprising:
- collecting sound generated from the sound wave generation source in the vacuum chamber by the sound wave collecting apparatus;
- converting sound wave information of sound collected from the sound wave collecting apparatus into an electrical signal by a feed-through and transmitting the electrical signal as electrical signal data outside the vacuum chamber;
- collecting and analyzing the electrical signal data transmitted outside the vacuum chamber; and
- diagnosing a state of the sound wave generation source according to the analysis result of the electrical signal data.

15. The acoustic measuring method of claim 14, wherein the transmitting of the electrical signal data is performed by using a WiFi communication apparatus.

16. The acoustic measuring method of claim 14, wherein the collecting and analyzing the electrical signal data is performed by using a computer.

17. The acoustic measuring method of claim 14, wherein the diagnosing the state of the sound wave generation source is performed manually by visual confirmation of the collected electrical signal data.

18. An acoustic measuring method using an acoustic measuring apparatus installed in a vacuum chamber to determine a state of a sound wave generation source in the vacuum chamber, the acoustic measuring apparatus comprising:
- a sound wave collecting apparatus in the vacuum chamber and configured to collect sound generated from the sound wave generation source in the vacuum chamber; and
- a feed-through configured to convert sound wave information of sound collected by the sound wave collecting apparatus into an electrical signal and to transmit the sound wave information outside the vacuum chamber, and the method comprising:
- collecting sound generated from the sound wave generation source in the vacuum chamber by the sound wave collecting apparatus;
- converting sound wave information of sound collected from the sound wave collecting apparatus into an electrical signal by a feed-through and transmitting the electrical signal as electrical signal data outside the vacuum chamber;
- collecting and analyzing the electrical signal data transmitted outside the vacuum chamber; and
- diagnosing a state of the sound wave generation source according to the analysis result of the electrical signal data,
- wherein the diagnosing the state of the sound wave generation source is performed by using an artificial intelligence (AI) voice analysis system.

19. The acoustic measuring method of claim 18, wherein the AI voice analysis system is configured to detect an operating state, an impact and vibration state, and an abnormality of a driving part of the sound wave generation source by classification by noise.

20. The acoustic measuring method of claim 18, wherein the AI voice analysis system is configured to determine a position of the sound wave generation source by a sound wave collected by a plurality of the sound wave collecting apparatuses installed at a plurality of positions.

* * * * *